Patented July 24, 1951

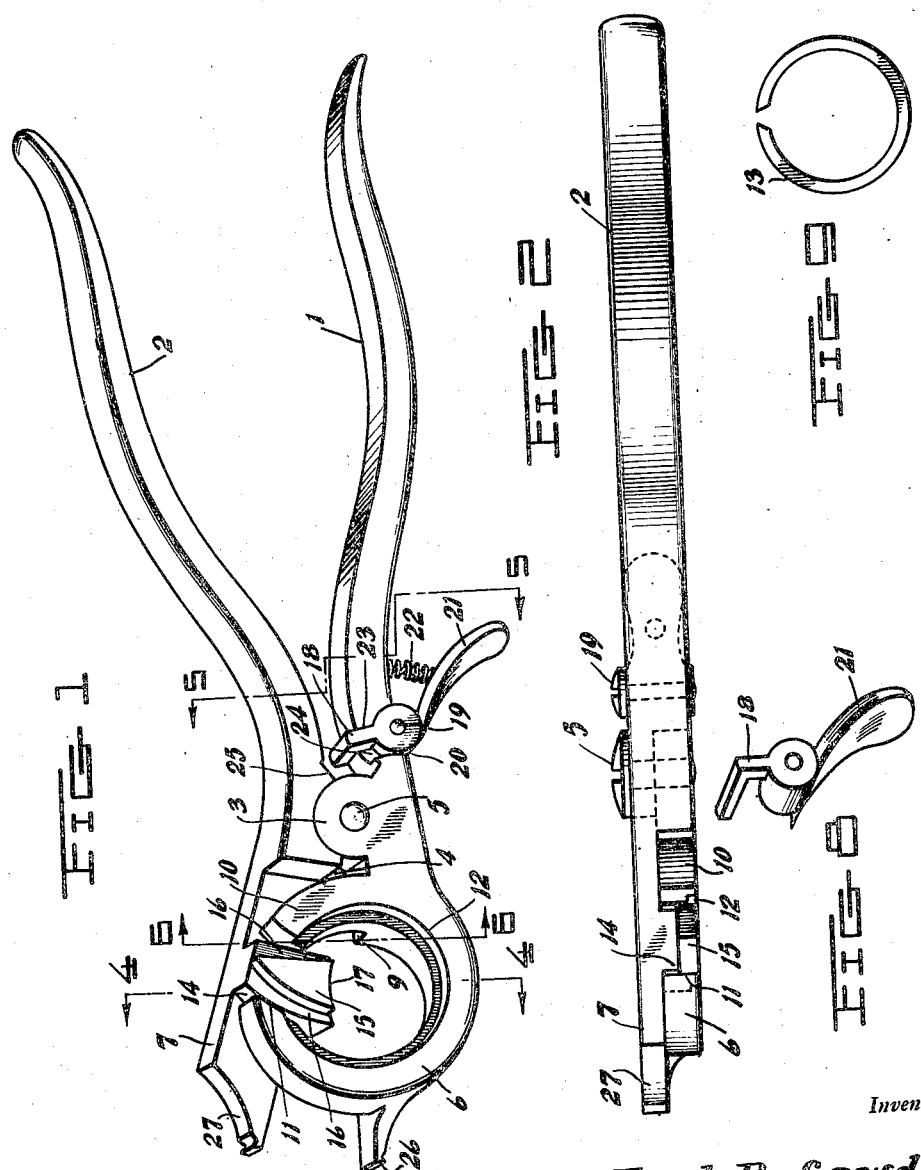

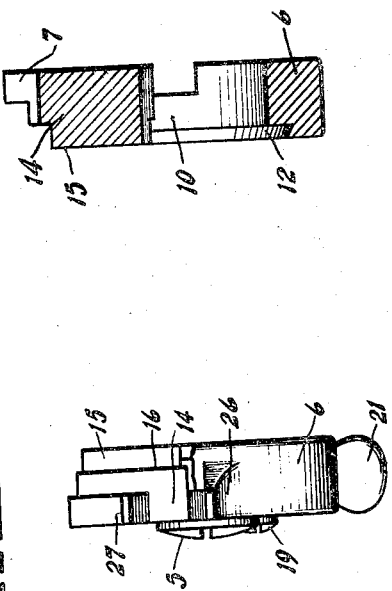
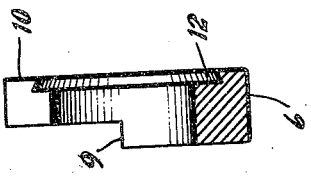

2,562,128

UNITED STATES PATENT OFFICE 2,562,128

SPLIT RING EXPANDING IMPLEMENT

Earl B. Sawdy, Howell, Mich., assignor to Eaton Manufacturing Company, Cleveland, Ohio, a corporation of Ohio Application March 4, 1946, Serial No. 651,823

4 Claims. (Cl. 29—229)

My invention relates to improvements in expanding implements, the primary object in view being to provide an implement of simple form and inexpensive construction for use in applying resilient snap rings to shafts, and the like, or in removing the same, quickly, easily and safely and which is especially designed to expand such rings without mutilating the same or otherwise impairing the usefulness thereof.

Other and subordinate objects, also comprehended by my invention, together with the precise nature of my improvements will be readily understood when the succeeding description and claims are read with reference to the drawings accompanying and forming part of this specification.

In said drawings:

Figure 1 is a view in perspective of my improved expanding implement in a preferred embodiment thereof.

Figure 2 is a view in plan,

Figure 3 is a view in front end elevation partly broken away,

Figure 4 is a view in transverse section taken on the line 4—4 of Figure 1,

Figure 5 is a similar view taken on the line 5—5 of Figure 1,

Figure 6 is another similar view taken on the line 6—6 of Figure 1,

Figure 7 is a fragmentary view in side elevation illustrating the manner in which the implement is designed to be used, Figure 8 is a view in perspective of the stop, and Figure 9 is a view in side elevation of a snap ring with which the implement is designed to be used.

Referring now to the drawings by numerals, my improved expanding implement, as shown, comprises a pair of coplanar pliers type handles 1, 2 pivotally connected together for relative swinging movement toward and from each other, the pivotal connection having the form of a pair of ears 3, 4 secured together side by side by a screw 5 and which project from opposed sides of said handles.

Forwardly of the pivotal connection of the handles 1, 2, the handle 1 is provided with a coplanar extension in the form of an arcuate ring holder 6, and the handle 2 with an extension having the form of a straight flat lever bar 7. The ring holder 6 and the lever bar 7 are arranged to be moved toward and from each other when the handles 1, 2 are swung away from and toward each other respectively. The ring holder 6 is stepped on one side to form a diametrical shoulder 9 on said side and a reduced half section 10 on the holder, and the lever bar 7 is offset laterally from the median plane of the holder 6 to work along side said section 10 and engage the shoulder 9 to thereby limit movement of said holder 6 and the lever bar 7 toward each other.

A circumferential, arcuate sided gap 11 is provided in the half section 10 of the holder 6 centrally thereof, and on the side thereof opposite the first mentioned side, said holder is formed with an internal, circumferential edge groove 12 designed to receive a split resilient ring 13 such as is shown in Figure 9. Such rings, as will be understood, are designed to be spread apart preparatory to installing in a mechanism, or on a machine part such as a grooved shaft, not shown.

A boss 14 is provided on the side of the lever bar 7 facing the ring holder 6 and which is designed to fit loosely in the gap 11 and is provided with a reduced front expander wedge 15 thereon and with stepped side grooves 16. The expander wedge 15 tapers toward the outer edge of the boss 14. As best shown in Figure 2, the expander wedge 15 lies in a common plane with the groove 12 and said wedge has a large end 17 formed in the arcs of the groove 12, all for a purpose presently seen.

A pivoted stop is provided on the handle 1, immediately in the rear of the described pivotal connection end which has the form of a right angled stop finger 18 pivoted, as at 19, on an ear 20 on said handle 1 and so as to work between the handles 1, 2. The stop finger 18 is provided with a finger grip tail piece 21 backed by a coil spring 22 interposed between the same and the handle 1. A shoulder 23 on said handle 1 establishes a normal position of said stop finger 18 and in which position said finger is arranged to limit swinging of the handles 1, 2 toward each other into a partly closed position. A side notch 24 in the handle 1 provides for swinging of said stop finger 18 from normal position, and the tail piece 21 is arranged for operation by a finger of a hand grasping the handles 1, 2 so that it may be moved rearwardly in opposition to the spring 22 to swing said stop finger 18 forwardly. A clearance notch 25 is provided in the handle 2 and into which the stop finger 18 may swing when the same is moved forwardly from normal position to thereby permit the handles 1, 2 to be swung toward each other into fully closed position as shown in dotted lines in Figure 7 with one handle abutting the other. A pair of forwardly extending nose extensions 26, 27 are provided on the holder 6 and lever bar 7 for swinging into abutting relation when the handles 1, 2 are swung away from each other into a fully opened position.

When it is desired to apply a ring 13, for instance to a shaft, not shown, the handles 1, 2 are swung away from each other into fully opened position as shown in full lines in Figure 7. In this position of said handles, 1, 2 the nose extensions 26, 27 are engaged, and lever bar 7 has been swung alongside the half section 10 of the ring holder 6 against the stop shoulder 9 to establish the fully open position of said handles 1, 2. The expander wedge 15 has been moved through the gap 11 into the ring holder 6 clear of said gap. A ring 13 may now be positioned in the groove 12 with the split thereof straddling the small end of said expander wedge 15, as shown in Figure 7. Now by grasping the handles 1, 2 and swinging the same toward each other into the described partly closed position thereof, the expander wedge 15 may be caused to move through and into the gap 11 and through the split in the ring 13, thereby expanding said ring in the groove 12 and thereby expanding the ring uniformly and preventing the ring from taking a permanent set. At this point, the larger end 17 of the expander wedge 15 is interposed in the split of the ring 16 and completes the inner edge of said ring, all as shown by the dot-dash lines in Figure 7, and said ring 16, together with the ring holder 7 may be slipped over a shaft or the like, not shown. The ring 13 may now be released to snap into engagement with such a shaft and by swinging the tail piece 21 to move the stop finger 18 from normal position forwardly into the clearance notch 25 and then swinging the handles 1, 2 toward each other into fully closed position as shown by dotted lines in Figure 7. In this operation of the handles 1, 2, the expander wedge 15 is moved completely through the split in the ring 13 so that said ring is released to contract about the shaft, or other part on which it is being applied. During expansion of the ring 13 the ends thereof ride in the grooves 16 as will be clear. The ring holder 6 may then be removed off the shaft, in a manner which will be clear. The nose extensions 26, 27 may be inserted, when engaged, in the split of the ring 17 and then separated by swinging the handles 1, 2 toward each other so that the ring may be opened preparatory to removing the same from the shaft, or the like.

The foregoing will, it is believed, suffice to impart a clear understanding of my invention, without further explanation.

Manifestly, the invention, as described, is susceptible of modification without departing from the inventive concept, and right is herein reserved to such modifications as fall within the scope of the appended claims.

What I claim is:

1. An implement for expanding resilient split snap rings comprising a pair of handles pivotally connected together for relative swinging movement toward and from each other into closed and open positions respectively, a front end extension on one handle including an arcuate ring holder having a gap therein and adapted to seat a ring inserted sidewise therein with the split opposite said gap, and a front end extension bar on the other handle provided with an expander wedge thereon spaced from the pivot of the handle and pivotally movable with the handle in an arcuate path from central disposition in the holder adapted to pass endwise radially outwardly through said gap, said bar and holder being movable toward each other upon swinging of said handles into open position to dispose said expander into the holder and thereby permit the ring to be inserted in said holder and around the expander, and said bar and holder being movable upon swinging of said handles toward closed position to cause said expander to pass through the split of the ring and through said gap outwardly thereof to expand said ring in said holder.

2. An implement for expanding a split ring comprising a hollow body member having a recess therein adapted to receive a split ring, said recess having a larger diameter than the normal outside diameter of said ring, a ring expander wedge normally disposed in the hollow of said body and mounted on said member for pivotal movement radially outwardly from the hollow with respect to the recess, means for moving said expander radially through the split in said ring for expanding the ring uniformly against the inner walls of said recess effective to prevent the ring from taking a permanent set, and releasable means for limiting the movement of said expander moving means at the point of maximum expansion of said ring and releasable to allow the wedge to move out of the split of the ring permitting the ring to return to normal size and shape.

3. An implement for expanding a split ring comprising a body having an aperture therethrough and a recess adjacent the aperture adapted to receive a split ring to be expanded, said recess having a larger diameter than the normal outside diameter of the ring, a ring expanding wedge movable radially outwardly with respect to the recess, in the plane thereof having a nose portion normally positioned adjacent the recess and wedge face surfaces thereof extending back from the nose to the base portion thereof disposed within the aperture in the body adapted to engage the ring with its wedge face surfaces and uniformly expand the ring received in the recess against the circumferential wall of the recess effective to prevent permanent set, and releasable means for limiting the movement of said expander moving means at the point of maximum expansion of said ring and releasable to allow the wedge to move out of the split of the ring permitting the ring to return to normal size and shape.

4. A tool for expanding a resilient split ring comprising a body having a circular aperture therethrough, a circumferential recess adjacent the aperture having an angular peripheral wall and a peripheral slot communicating with the recess, said recess adapted to receive a resilient split ring with the split portion thereof substantially in radial alignment with the slot, wedge shaped means normally disposed in the aperture with the nose thereof adjacent the peripheral slot movable radially outwardly through the slot engageable with the ends of the ring within the split portion of the ring for expanding the ring in the recess into peripheral abutment with the angular wall, and releasable means for limiting the movement of said expander moving means at the point of maximum expansion of said ring and releasable to allow the wedge to move out of the split of the ring permitting the ring to return to normal size and shape.

EARL B. SAWDY.

REFERENCES CITED

The following references are of record in the file of this patent:

UNITED STATES PATENTS

| Number | Name | Date |
|---|---|---|
| 1,079,564 | Komancsek | Nov. 25, 1913 |
| 1,764,146 | Bramberry | June 17, 1930 |
| 1,923,199 | Hackney | Aug. 22, 1933 |

FOREIGN PATENTS

| Number | Country | Date |
|---|---|---|
| 501,252 | Germany | June 30, 1930 |